INVENTOR
ALAN J. DEERFIELD
BY Herbert W. Arnold
ATTORNEY

United States Patent Office 3,370,292
Patented Feb. 20, 1968

3,370,292
DIGITAL CANONICAL FILTER
Alan J. Deerfield, Burlington, Mass., assignor to Raytheon Company, Lexington, Mass., a corporation of Delaware
Filed Jan. 5, 1967, Ser. No. 607,562
15 Claims. (Cl. 343—5)

ABSTRACT OF THE DISCLOSURE

A digital canonical filter employing a reference storage table into which values are fed for weighting entering digital signals according to the desired characteristics of the filter, together with feedback and feed forward delay registers and summing devices for providing a combined output indicative of whether or not the entering digital signals are within values defined by the filter.

This invention relates to digital filters and more particularly to a digital canonical filter capable of being applied to a plurality of specific filtering operations.

Although the configuration of a canonical filter can be used to implement many specific operations, it is generally difficult to alter the parameters of such filter so that a single filter can be used for a plurality of different filtering operations. For example, a canonical filter can be used to achieve a particular desired filtering operation. However, if a second specific filtering operation is required, a canonical filter can be used providing it is specifically altered to the requirements of the second filter operation. This means that two canonic filters are necessary with their attendant implementation to the specific applications. It has not been possible to use a single canonic filter to perform multiple filtering operations for the reason that once a particular set of filter coefficients is selected to perform a given filtering operation, that form is, in effect, frozen and the canonic filter can no longer be considered general or canonic. It is accordingly an object of the present invention to utilize a single digital canonic filter and without mechanical or hardware modification to render it applicable for use in any desirable set of filter operations, thus, assuming the form of many filters.

While canonical filters have been used in analog operations, demands for increased accuracy have led to digital canonic methods. In digital filtering operations, however, difficulties relating to operational speeds arise due to the excessive number of multiplications required and, thus, while canonical filters are useful for certain operations requiring relatively low speeds, generally they have not heretofore been used successfully in digital operations at high speeds. It is accordingly a further object of the invention to provide a novel filter which eliminates the multiplications required in a desired filter operation, thus permitting the canonical filter to operate in digital form at high speeds. More particularly an object of the invention is to provide an improved digital canonic filter capable of performing high speed digital operations and with the further capability of being adapted to the solution of multiple filter operations by changing filter parameters electrically rather than mechanically.

It has been found in accordance with the present invention that a canonical digital filter may be provided having a look-up or reference table for storing sets of weighted digital values according to a desired filter operation, and combining said values with the variables of the input signal, together with means for recombining the variables of the input signal which have been delayed in predetermined unitary sequences, for a plurality of combinations with the stored values of the reference table to provide a signal indicative of whether or not the values of the input signal are within filter limits defined by the reference table.

The system of the invention comprises generally means for summing an input signal to be measured with a plurality of signals each representative of a value which is weighted in a specific manner in accordance with the desired characteristics of said filter, a look-up or reference table for weighting and storing first and second sets of products of said summing means, a feedback loop including means for delaying over progressively greater unitary periods the stored products of the first set of said table corresponding to said weighted values, the outputs of said delaying means being coupled to the corresponding portion of said summing means, a feed forward loop including means for delaying over progressively greater unitary periods the second set of weighted and stored products of said table, and means for summing each of said delayed stored products of said second set of delayed values to provide an output signal indicative of whether or not the values of said input signal are within the values defined by said filter.

The invention in its broader aspect contemplates a comparison of the input signal with weighted values of a reference table and the selecting of a particular set of stored products in response to the input signal together with delaying over progressively greater unitary periods the selected products, and means for summing the delayed products to provide a signal indicative of the desired degree of correlation of the input signal to the stored values.

A better understanding of the invention together with further objects and advantages thereof will be better understood from a consideration of the following description taken in connection with the accompanying drawings in which:

FIG. 3 is a block diagram of a further preferred embodiment of a digital canonical filter of the invention.

Figure 1:
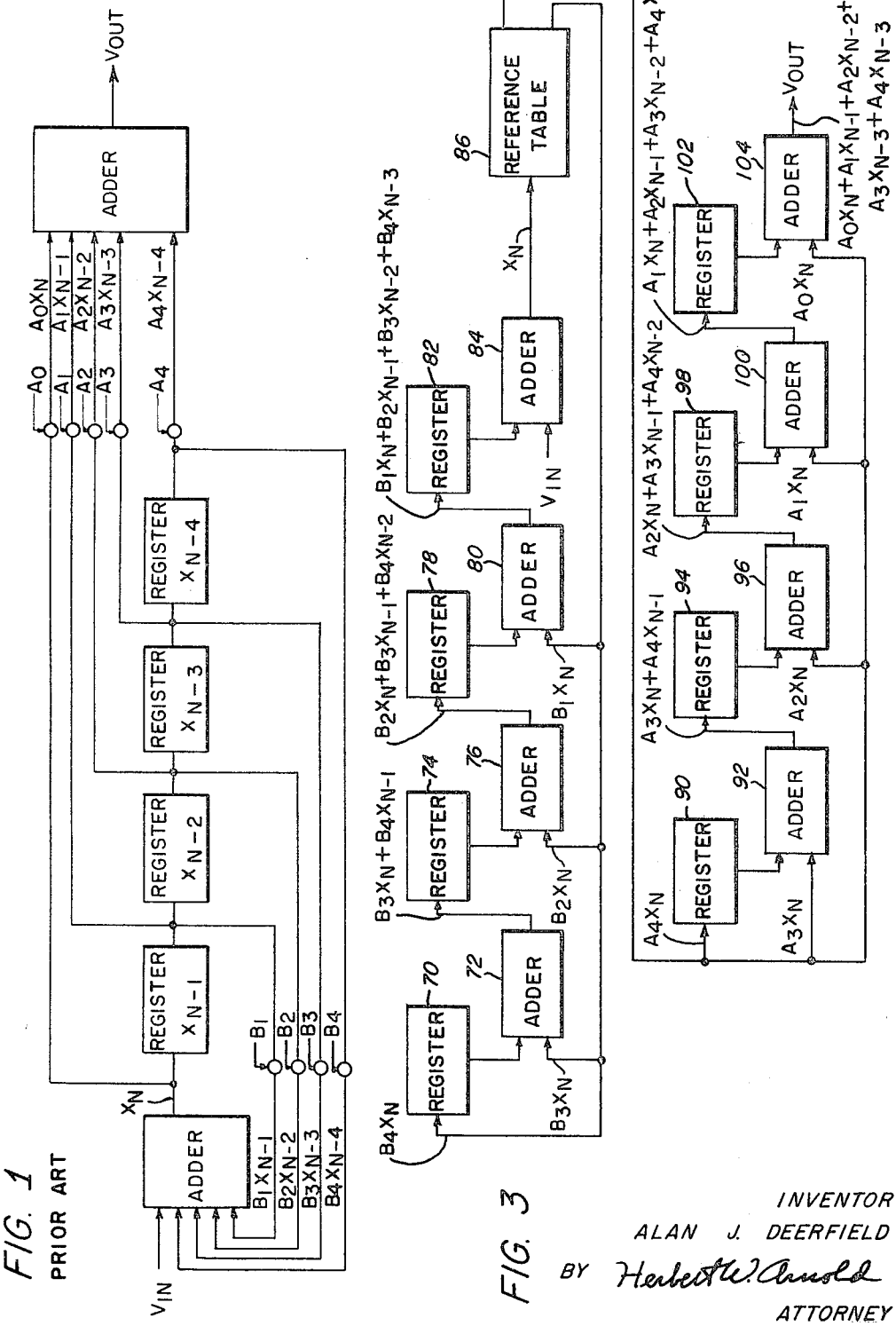
FIG. 1 is a block diagram of a conventional logical implementation of a canonical digital filter.

Referring to FIG. 1, the system shown therein exhibits the conventional form of canonical filter, usually encountered in an analog implementation. In the analog form, each of the components designated "register" generally represent analog delay lines. A filter of this sort is shown on page 133 of "Introduction to Radar Systems" by Merrill I. Skolnik, published by McGraw-Hill, 1962. It is necessary that the delay lines in such filters be carefully controlled so that corresponding values, that is related samples, from each delay occur simultaneously at the output of each register or delay line. This operation generally is difficult to achieve, particularly when the canonical filter has the additional disadvantage of being sensitive to amplitude variations which tend to change the characteristic pass band of the filter from the desired values. In the digital equivalent shown in FIG. 1, the delay lines of the analog version are replaced by storage units which may have, for example, a capacity of 8 bits each. An input signal which is to be measured or scaled with a plurality of signals each representative of a value which is weighted in a specific manner in accordance with the desired characteristics of the filter, is applied to the sum junction or adder by way of the signal designated $V_{IN}$. The values of $V_{IN}$ are related values which comprise the input signal to be measured. These related values are usually extracted from a digital core memory or similar device, not shown, for insertion into the device. In FIG. 1 feedback and feed forward lines are shown in which the values $X_{N-1}$, $X_{N-2}$, $X_{N-3}$ and $X_{N-4}$ are scaled prior to entering the input and output summing junctions.

In a digital system, scaling is equivalent to a multiplication process. For example, some $B_1$ by which the first portion of the filter characteristic is weighted is multiplied by the value $X_{N-1}$ in the register to provide the first value entering the adder or summing junction for the product $B_1X_{N-1}$ on the first feedback line shown in FIG. 1. The summing junction or adder fed by $V_{IN}$ represents a conventional digital adder-subtractor device. Thus, to update the filter in order to provide an output at the input adder, products of the aforesaid multiplication process which constitute the feedback values on each of the feedback lines are formed. These are then accumulated or added and simultaneously summed with the digital sample $V_{IN}$ in the input adder. This produces a new $X_N$ value, for example, $X_5$ at time $t_5$, which travels through $X_{N-1}$ at $t_6$, $X_{N-2}$ at $t_7$, $X_{N-3}$ at $t_8$ and $X_{N-4}$ at $t_9$. In like manner, the five feed forward products beginning with $A_0X_N$ are formed and summed in their respective adder to produce the output signal $V_{OUT}$. The values of $X_N$, $X_{N-1}$, $X_{N-2}$, $X_{N-3}$ and $X_{N-4}$ are then positioned to the right, such that $X_N$ becomes $X_{N-1}$; $X_{N-1}$ becomes $X_{N-2}$; $X_{N-2}$ becomes $X_{N-3}$; and $X_{N-3}$ becomes $X_{N-4}$; and the process repeats. Each storage element or register represents a pole or zero on the filter. The present filter is shown having four poles or zeros although a filter may be formed having any desired number of poles and zeros.

Digitally this form of filter configuration is impractical for high speed operation due to the excessive number of multiplications required in order to update the filter at any given instant. In the specific configuration shown in FIG. 1, nine products are required for each updating. Since updating may be desired at a rate of between say 1 and 10 megacycles, it can be readily understood that it is difficult, if not impossible, to perform the required number of multiplications in the duty period allotted. While extensive multiplication can be avoided by utilizing a table look-up technique to find the products of the multiplication process, even this procedure requires a look-up or reference table and in the present example of a four pole filter nine look-ups are required for each updated or completed duty period. It is, therefore, an important object of the invention to provide a flexible digital operating arrangement which permits a canonical filter to operate in the digital mode at high speeds with the minimum number of required mathematical operations.

Figure 2:
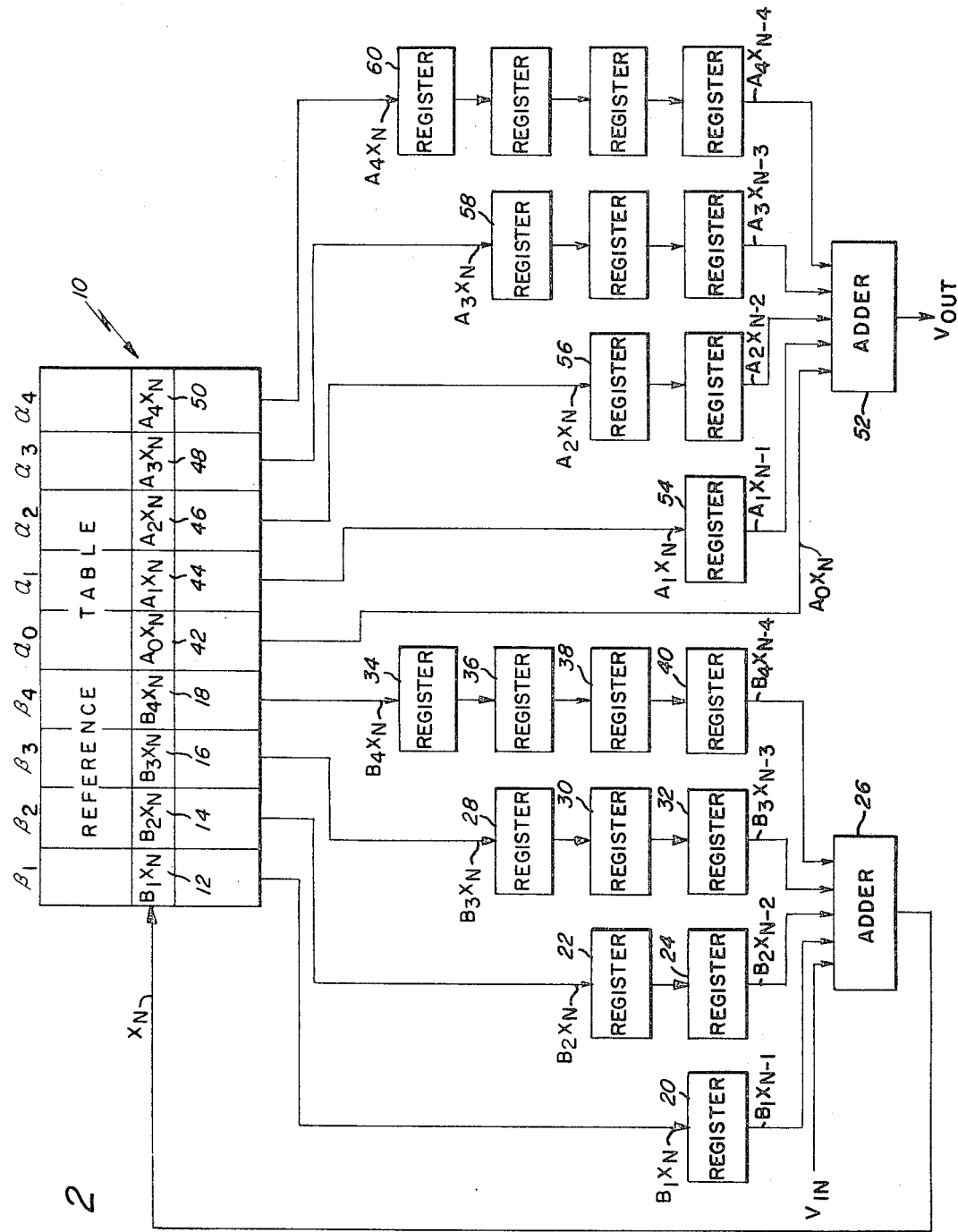
FIG. 2 is a block diagram of one embodiment of the present invention.

Referring to FIGS. 1 and 2, a solution to the problem of high speed operation is achieved through a recognition of two important concepts. The first observation is that the values of B and A are specific constants for any given set of filter characteristics. For example, if $B_1$ is a specified constant and $X_{N-1}$ is, say, 8 bits, only 256 products of $B_1X_{N-1}$ are possible. Accordingly, a reference or look-up table 10, as shown in FIG. 2, is provided in which the products of $B_1$ can be stored. The reference table could be implemented by means of magnetic core storage units. The table values are typically entered into the beta and alpha columns by means of a magnetic tape unit, not shown. Reference table 10, in the present embodiment, consists of only 256 words corresponding in the present embodiment to all of the possible values of $X_N$, the products corresponding to $B_1$ being written into a portion of each word. These products are stored in portion 12 of the table which comprises a set of columns of magnetic core storage units for storing the various products of $B_1$. In like manner, the products corresponding to $B_2X_{N-2}$ can be formed and placed in column 14 of the table in advance of the introduction of the sample values of $V_N$ into the system. The values of $B_3$ and $B_4$ are stored in columns 16 and 18, respectively, of reference table 10.

The second important observation is noted when it is seen that the values of $X_{N-1}$, $X_{N-2}$, $X_{N-3}$ and $X_{N-4}$ are identical to the value $X_N$ displaced in time as indicated in the equation shown accompanying FIG. 2 that is $X_N$ at time N becomes $X_{N-1}$ at time $N+1$. The products $B_1X_{N-1}$ can be found by simply referencing the value $B_1X_N$ in the table and storing the products in the registers feeding adders 26 and 52 for later use. As shown in FIG. 2, a single table look-up utilizing the value $X_N$ is sufficient for each updating cycle of the values of $V_N$. The entire set of products which correspond to the reference value $X_N$ is read out of the table and distributed to the corresponding storage elements shown in FIG. 2. For example, the set of products are read out of the memory or table segment 12 of reference table 10 and distributed to storage register 20. The products $B_2X_N$ in element 14 of the reference table are distributed to register or delay unit 22. It is then observed that $B_1X_N$ delayed one time interval in register 20 becomes $B_1X_{N-1}$ which corresponds to the first product entered in the canonical representation shown in FIG. 1. In like manner, $B_2X_N$ delayed two time intervals by registers 22 and 24 becomes $B_2X_{N-2}$ and is applied to adder 26 simultaneously with that of the value $B_1X_{N-1}$. The values of $B_3X_N$ are then read into register 28 and with registers 30 and 32 are delayed three time intervals to become $B_3X_{N-3}$. The values in column 18 of the reference table are applied to registers 34, 36, 38 and 40 to become the quantity $B_4X_{N-4}$ applied to adder 26. These four values are fed back and simultaneously summed with $V_{IN}$ to update that portion of the filter. In like manner, the specific values which have been stored for $A_0$ in register 42, $A_1$ in register 44, $A_2$ in register 46, $A_3$ in register 48 and $A_4$ in register 50 of reference table 10 are simultaneously read out along with the B values and fed forward, respectively, to adder 52, via delaying registers 54, 56, 58 and 60. After the appropriate time delay, in the same manner as shown prior to the introduction of values in adder 26, the values are summed in adder 52 to provide the output signal, $V_{OUT}$ which is indicative of the desired degree of correlation of the input signal $V_{IN}$ to the stored values. After the values have been read from reference table 10 and the sum $V_{OUT}$ formed, the entire set of unit register delays is shifted to the next lower set of register delay units, such as registers 24, 30 and 36, in the conventional manner and a new value $V_{IN}$ is supplied. The next value of $X_N$ is computed and the process repeats to indicate the degree of correlation of this new value $V_{IN}$ to the stored values. As is known, the frequency response of an electrical network can be expressed as the ratio of two polynominals. The roots of the numerator polynominals are called zeros and those in the denominator are called poles. These roots are useful tools in that they completely describe the response of the network. If it is desired to increase the number of poles or zeros of the filter, the number of storage elements required in this embodiment also increases. For example, a fifth pole or zero requires five additional storage units for both the feed forward and feedback paths. Where FIG. 1 shows an embodiment which is digitally impractical for high speed operation, the embodiment of FIG. 2, according to the invention, employs a minimum number of operational steps and is consequently a practical solution to the problem of high speed digital implementation of a canonical filter. Although FIG. 2 is a practical embodiment in terms of speed of operation performed, it does not represent the minimum componentry in terms of the number of components to implement the system of FIG. 2.

In particular, FIG. 3 is a preferred embodiment of the invention and is derived from two observations. The first is that the summation may be formed in any sequence. For example, $B_3X_{N-3}$ and $B_4X_{N-4}$ could be formed first. The second observation is that this sum may also be formed early. It may, for example, be formed as early as the arrival of $B_4X_N$ delayed only one time interval by a register 70 of FIG. 3. This sum entering adder 72 eliminates the need for the storage elements 28, 30 and 32 in the $B_3X_N$ column of FIG. 2. The resulting sum delayed one time interval by adder 74 is combined with $B_2X_N$ in adder 76. This new sum at the output of adder 76 is delayed one time interval in register 78 and combined with the quantity $B_1X_N$ in adder 80. The output of adder 80 is then delayed for a period of one unit in register 82 and combined with the input signal $V_{IN}$ in adder 84 to provide a value of $X_N$ fed into reference table 86, identical to reference table 10 of FIG. 2. The values of the signals entering the respective registers are shown in the equations above each register. Thus, it can be seen that the summation of $B_2X_N$ with the output of register 74 effectively eliminates registers 22 and 24, and the addition of the output of register 78 with the quantity of $B_1X_N$ eliminates the corresponding register 20 of FIG. 2. Thus, there remains only registers 34, 36, 38 and 40 in the $B_4X_N$ column of FIG. 2; these registers correspond respectively to registers 70, 74, 78 and 82 of FIG. 3. The indicated combined sums which have been described above for entry into each register are shown in the equations opposite the respective register in FIG. 3. In like manner, the value $A_4X_N$ delayed one time interval in register 90 is combined with the value $A_3X_N$ in adder 92 to provide the summation of $A_3X_{N-3}$ and $A_4X_{N-4}$. This sum eliminates the need for the storage elements in the $A_3X_N$ column of FIG. 2. The resulting sum delayed one time interval in register 94 is combined with $A_2X_N$ in adder 96. The new sum from adder 96 delayed one time interval in register 98 is combined with $A_1X_N$ in adder 100. This arrangement eliminates the storage elements ni the $A_3X_N$, $A_2X_N$ and $A_1X_N$ columns in FIG. 2. The output of register 102 is summed in adder 104 to provide $V_{OUT}$. In this manner the embodiment of FIG. 3 provides high speed digital implementation of a canonical filter and represents logically the minimum number of components required. It should be noted that each pole of the filter requires only one unit of storage and a conventional adder for each of the feed forward and feedback paths.

The reference table 86 can be constructed in a plurality of ways. For example, a general purpose table can be summed from a well known Biax-type memory with speeds presently available up to 100 nanoseconds. This permits the filters to operate at a 10 megacycle rate. Specific tables can be formed from a diode matrix and the products in table 86 can be included to any desired precision. As precision is increased, the width of the storage, that is; the number of bits per word, and adder elements is also increased. Only the most significant part of the value of $X_N$ is required to correspond to the length of the table, that is; the number of words contained therein. In like manner, the length of the table for $X_N$ can be increased for maximum precision. For example, a 10 bit $X_N$ would require a table 1024 words long, that is; $2^{10}$ words.

Figure 4:
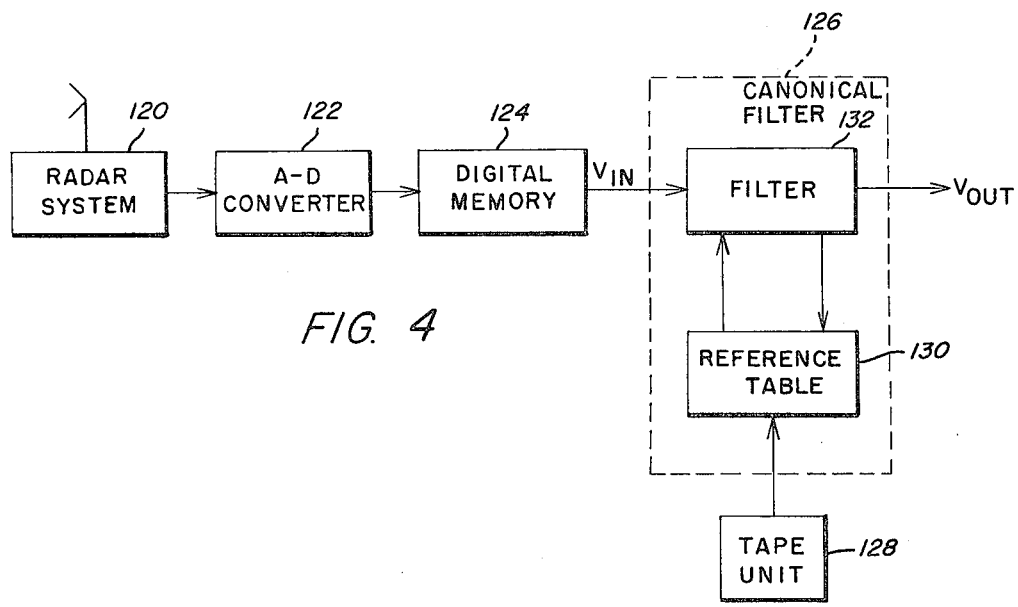
FIG. 4 is a block diagram of the digital canonical filter used in conjunction with a radar system.

As is known, there are many applications and uses for a canonical filter. Referring to FIG. 4, for example, there is shown a typical application of a canonical filter for use with a radar system. However, other applications may include signal processing in communications systems and the like. In the system shown in FIG. 4, the canonical filter is used as a signal processor in which radar signals from a target, not shown, enter a radar system 120 and a bi-polar video output is produced. This video signal output is then converted from analog form to digital form in a conventional A–D converter 122. A succession of converted values is temporarily stored in a well known digital memory 124. Subsequently, these stored values are read out of the memory in any desired sequence, not necessarily corresponding to the sequence in which they are stored. If the sequence in which the data is received is identical to the sequence in which it is desired that it be processed, then the digital memory is not required. The data which is read out of digital memory 124 corresponds to the $V_{IN}$ values of canonical filter 126.

One of the uses of the canonical filter in the embodiment of FIG. 4 is to detect targets in a high clutter environment, as, for example, described in connection with the canonical filter shown on page 133 of the aforementioned reference to Skolnik. In the preceding description of the canonical filter shown in FIGS. 2 and 3 it was indicated that the reference table was initially filled or loaded with weighting values from an input device or tape unit, such as tape unit 128 of FIG. 4. After the reference table 128 is filled with values corresponding to the desired filter characteristics, the system is used to process radar return signals. The reference table 130 does not require change of its weighted values until a new set of filter characteristics for use with filter 132 is desired. For example, in clear weather a particular set of given filter characteristics may be ideal to detect targets. However, in the event of rain, the filter characteristics require a new set of weighted values to compensate for the change in the environment. An output signal from the filter 132 indicates the detection of a target when its digital value exceeds a given threshold which is predetermined for a given radar detection operation.

This completes the description of the embodiments of the invention illustrated herein. However, many modifications and advantages thereof will be apparent to those skilled in the art without departing from the spirit and scope of this invention. For example, the canonical filter above-described can be used for other applications requiring high speed operation. These operations may include speech or frequency spectrum analysis. Accordingly, it is desired that this invention not be limited to the particular details of the embodiments disclosed herein except as defined by the appended claims.

What is claimed is:

1. A data handling device comprising a reference table for storing digital products representative of values weighted in a specific manner in accordance with the desired characteristics of said device, a feedback loop including means for delaying over progressively greater unitary periods stored products of said table corresponding to said weighted values, means for summing an input signal with the delayed inputs of said feedback loop, the output of said summing means being coupled to said reference table, a feed forward circuit including means for delaying over progressively greater unitary periods stored products of said table corresponding to said weighted values, and means for summing said latter delayed stored products to provide an output signal indicative of whether or not the values of said input signal are within the values defined by said device.

2. In combination, means for providing digital signals representing a reference function, means for supplying digital values of the variables of an input signal whose value varies in a measurable manner, means for delaying said values in a predetermined unitary sequence, means for combining said delayed values of said variables with related values in said reference function, and means for repositioning the combined values of said variables for a plurality of combinations with said values of said reference function to provide a signal indicating whether or not the values of said input signal are within the values defined by said reference function.

3. A data handling device comprising a reference table for storing digital values in accordance with the desired characteristics of said device, means for coupling an input signal to said reference table, means for selecting a particular set of stored digital values in response to said input signal, a feed forward circuit including means for delaying over progressively greater unitary periods said selected values of said table, and means for summing said delayed values to provide an output signal indicative of whether or not the values of said input signal are within the values defined by said device.

4. A data handling device comprising a reference means for storing digital values in accordance with the desired characteristics of said device, means for coupling an input signal to said reference table, means for selecting a particular set of stored digital values in response to said input signal, a feed forward circuit including means for delaying over progressively greater unitary periods said selected values of said table, and means for summing said delayed values to provide an output signal indicating when the values of said input signal are within the values defined by said device.

5. A digital canonical filter comprising a reference table for storing digital values in accordance with the desired characteristics of said filter, a plurality of delay registers, feedback and feed forward circuits coupled to said reference table and comprising a plurality of said delay registers and summing means for each register, means for introducing a digital input signal into said feedback circuit, and means for deriving an output signal from said feed forward circuit indicating when the values of said input signal are within values defined by said filter.

6. In combination, a radar system adapted to provide signals representative of return echos, an A–D converter fed by said signals to provide digital signals representative of said signals, a canonical digital filter including a reference storage device fed by said digital signals, said digital signals entering said filter being weighted by signal values stored in said reference storage device according to particular characteristics of said digital signals, and means for extracting an output signal from said filter representative of whether or not said entering digital signals are within values defined by said filter.

7. The system defined in claim 6 in which the signals representative of return echoes are bi-polar video signals.

8. The system defined in claim 6 in which digital memory means is interconnected in circuit with said A–D converter and said canonical digital filter.

9. A data handling device comprising reference storage means for storing digital values in accordance with the desired characteristics of said device, means for selecting a particular set of stored digital values in response to values of an input signal entering said storage means, a plurality of delay registers and summing devices serially connected in feed forward and feedback circuitry and being coupled to said storage means, said selected digital values being delayed over progressively greater unitary periods in said delay registers and summed in said summing devices to provide an output signal indicating when the values of said input signal are within values defined by said filter.

10. A digital canonical filter having a reference storage table.

11. In combination, a radar system adapted to provide radar signals representative of return echoes, an A–D converter fed by said radar signals to provide digital signals representative of said radar signals, and a canonical digital filter fed by said digital signals, said canonical filter having a reference storage table for weighting said digital signals according to the desired characteristics of said filter.

12. A digital canonical filter having a reference storage table, means for storing digital values in said reference storage table thereby to weight digital signals entering said filter according to a predetermined set of values, and means for extracting an output signal from said filter indicative of when said entering signals are within said values defined by said filter.

13. A digital canonical filter having a reference storage table for weighting digital signals entering said filter according to values stored in said reference table, and means for extracting an output signal from said filter indicating when said entering digital signals are within values defined by said filter.

14. In combination, a receiving system adapted to provide information signals representative of received signals, means for converting said information signals to digital signals, and a canonical digital filter coupled to said digital signals, said canonical filter having a reference storage table for weighting said digital signals according to values stored in said table.

15. The system defined in claim 11 in which tape unit means provides digital weighting signals for application to said digital filter.

No references cited.

RODNEY D. BENNETT, *Primary Examiner.*

RICHARD A. FARLEY, *Examiner.*

C. L. WHITHAM, *Assistant Examiner.*